Aug. 1, 1950 L. GOTTLIEB 2,517,301
SODA WATER DISPENSER
Filed Dec. 21, 1944 4 Sheets-Sheet 1
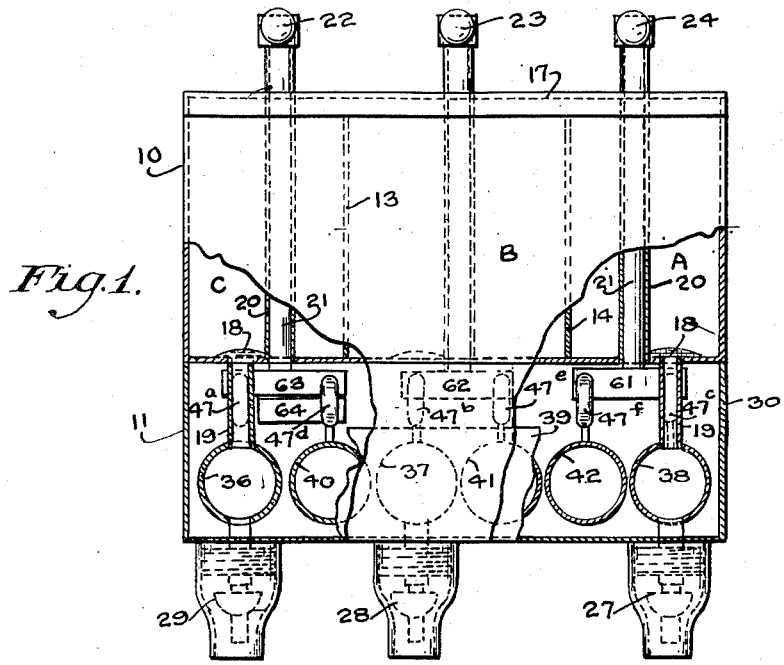
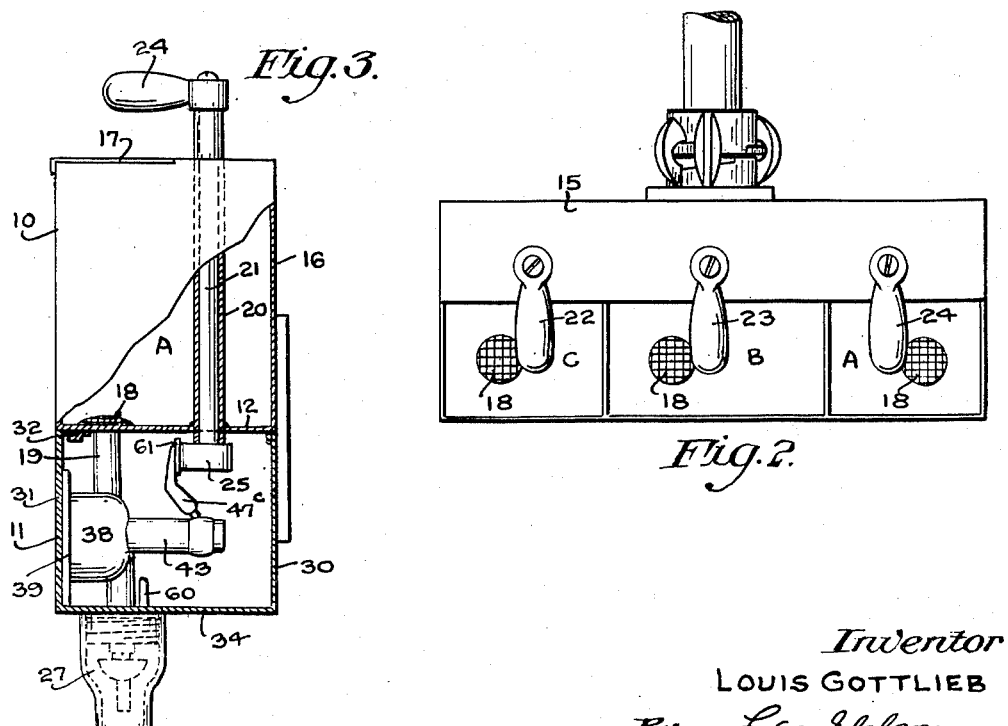
Inventor
LOUIS GOTTLIEB
By Leon Edelson
Attorney.

Aug. 1, 1950  L. GOTTLIEB  2,517,301
SODA WATER DISPENSER
Filed Dec. 21, 1944  4 Sheets-Sheet 2

Inventor
LOUIS GOTTLIEB
By Lew Edelson
Attorney.

Aug. 1, 1950 L. GOTTLIEB 2,517,301
SODA WATER DISPENSER
Filed Dec. 21, 1944 4 Sheets-Sheet 3
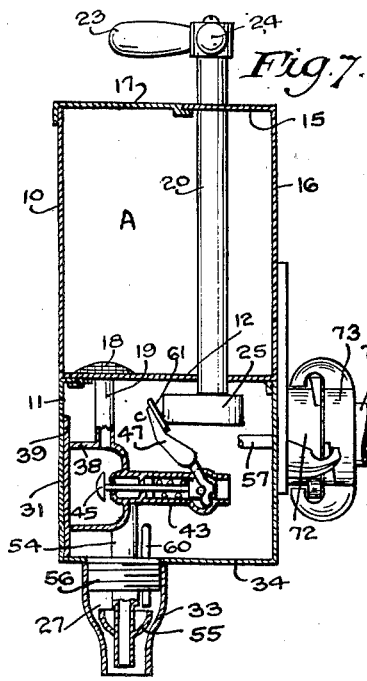
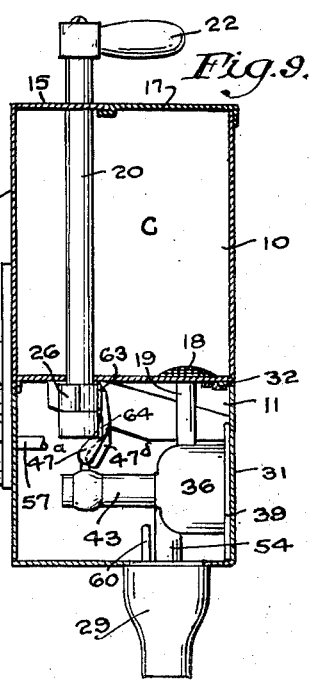
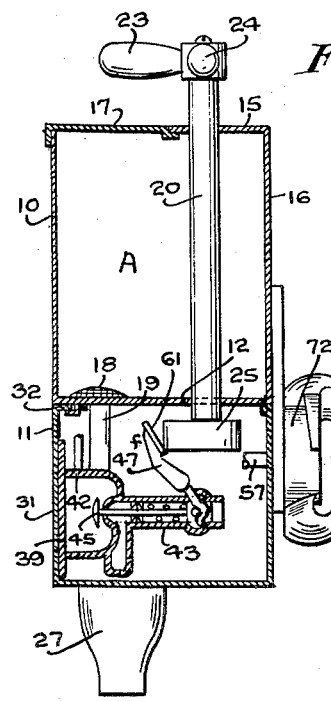
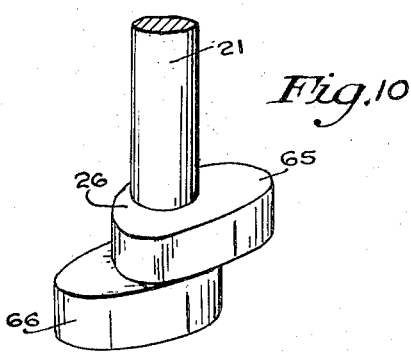
Inventor
LOUIS GOTTLIEB
By Leo Edelson
Attorney.

Aug. 1, 1950      L. GOTTLIEB      2,517,301
SODA WATER DISPENSER
Filed Dec. 21, 1944      4 Sheets-Sheet 4
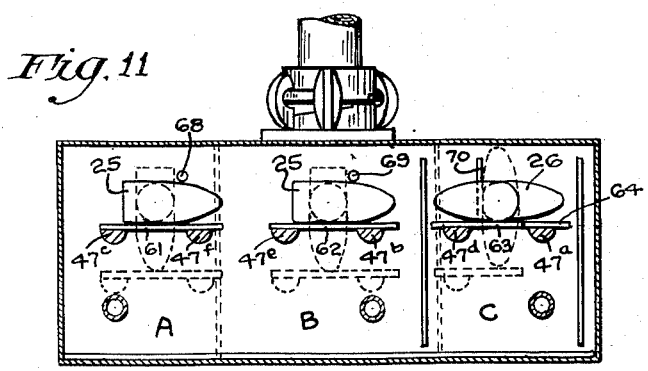
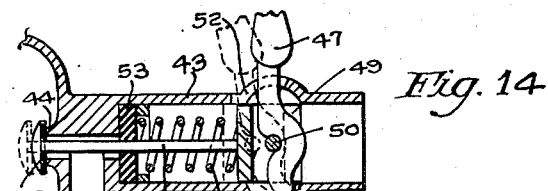
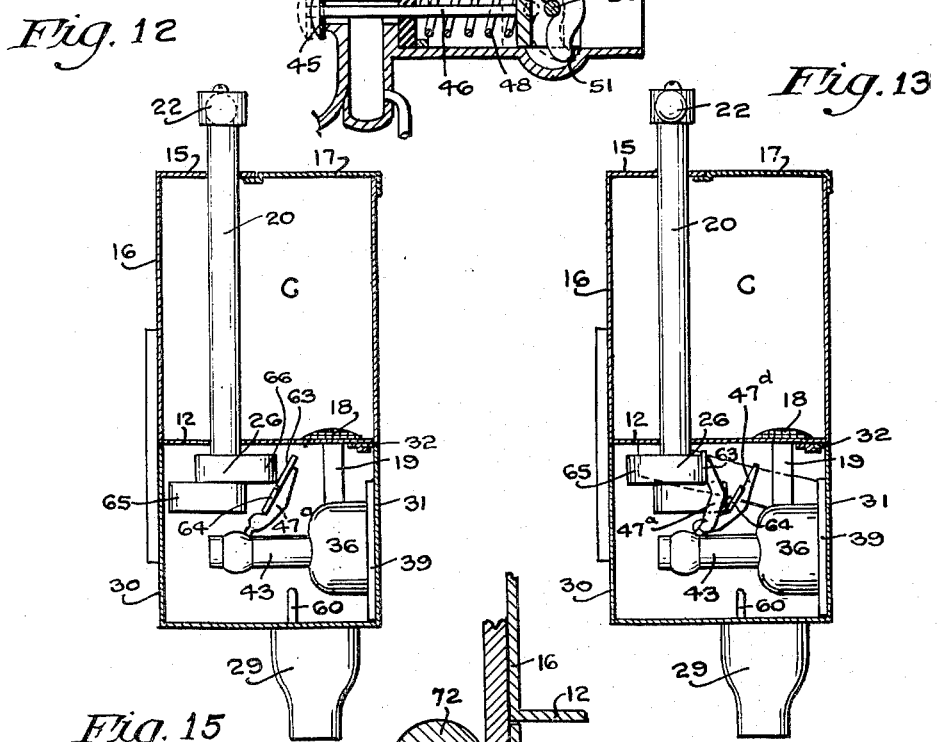
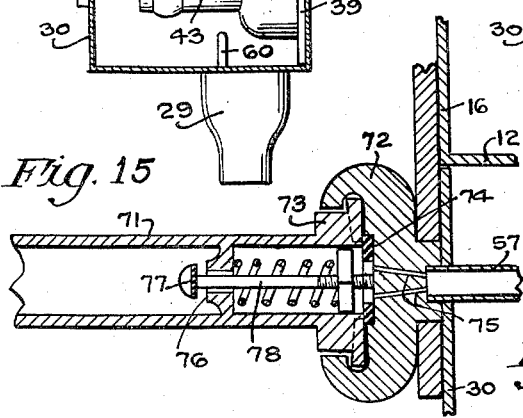
Inventor
LOUIS GOTTLIEB
By Leav Edelson
Attorney.

Patented Aug. 1, 1950

2,517,301

UNITED STATES PATENT OFFICE 2,517,301

SODA WATER DISPENSER

Louis Gottlieb, Philadelphia, Pa.

Application December 21, 1944, Serial No. 569,144

3 Claims. (Cl. 225—21)

This invention relates generally to soda fountains and more particularly to an improved apparatus for selectively dispensing any one of several different kinds of carbonated beverages or the carbonated water itself.

Among the principal objects of the present invention is to provide a simple, inexpensive and exceedingly compact beverage dispensing apparatus by means of which any one of a number of different flavoring syrups may be mixed with carbonated water as the latter is being forcibly delivered to the container for the beverage, the apparatus being particularly characterized in that is is designed to deliver plain carbonated water, as desired, without any increase in the number of valves required for selectively dispensing the flavored beverages.

A further object of the present invention is to provide a novel arrangement of control valves and discharge tubes for the carbonated water and the several flavoring syrups whereby the carbonated water from a single source of supply may be delivered independently of the flavoring syrups or selectively combined with any one of such syrups as may be desired, the beverage being dispensed in each case by the single manipulation of a selected control valve handle.

Still another object of the present invention is the provision of a simple construction and design of a multiple-compartment beverage dispensing unit in which is included means for selectively discharging any one of several flavoring syrups for mixing with carbonated water derived from a single source of supply, the general arrangement of the apparatus being such that it may be conveniently mounted as part of any existing bar installation for quick-detachable connection to the carbonated water conduit with which such bar installations are normally fitted.

Still another object is to provide an apparatus of the character aforesaid in which the various control elements are so constructed and arranged as to permit easy servicing of the same as required and to facilitate refilling the syrup compartments when the supply of syrup therein becomes exhausted.

A still further and important object of the present invention is to provide an apparatus for dispensing any one of several different kinds of carbonated beverages which is of such simple and compact design and is so adapted for detachable mounting as part of an existing bar installation that it may be readily removed from such installation as desired to facilitate cleaning and general servicing thereof, the apparatus of the present invention including as a feature thereof means for effecting quick-detachable coupling of the carbonated water supply tube with the main conduit leading to the supply of carbonated water.

Other objects and advantages will appear more fully hereinafter, it being understood that the present invention consists substantially in the combination, construction, location and relative arrangement of parts, all as will appear more fully hereinafter, as shown in the accompanying drawings and as finally pointed out in the appended claims.

In the said accompanying drawings:

Figure 1 is a front elevational view, partly in section, of the beverage dispensing apparatus as constructed in accordance with and embodying the principles of the present invention;

Figure 2 is a top plan view thereof;

Figure 3 is a side elevational view thereof, with a portion shown broken away and sectioned to reveal certain internal details of the apparatus;

Figure 7 is a vertical sectional view taken on the line 7—7 of Figure 4;

Figure 8 is a vertical sectional view taken on the line 8—8 of Figure 4;

Figure 9 is a vertical sectional view taken on the line 9—9 of Figure 4;

Figure 10 is a perspective view of the double acting valve operating element;

Figure 11 is a horizontal sectional view taken on the line 11—11;

Figures 12 and 13 are views corresponding to Figure 9, but showing, respectively, the valve operating member in its two operative positions;

Figure 14 is a sectional view of one of the valves employed for controlling the discharge of either the flavoring syrup or carbonated water; and Figure 15 is a sectional view of the coupling members and associated valve for connecting the supply of carbonated water to the beverage dispensing unit of the present invention.

Figure 4:
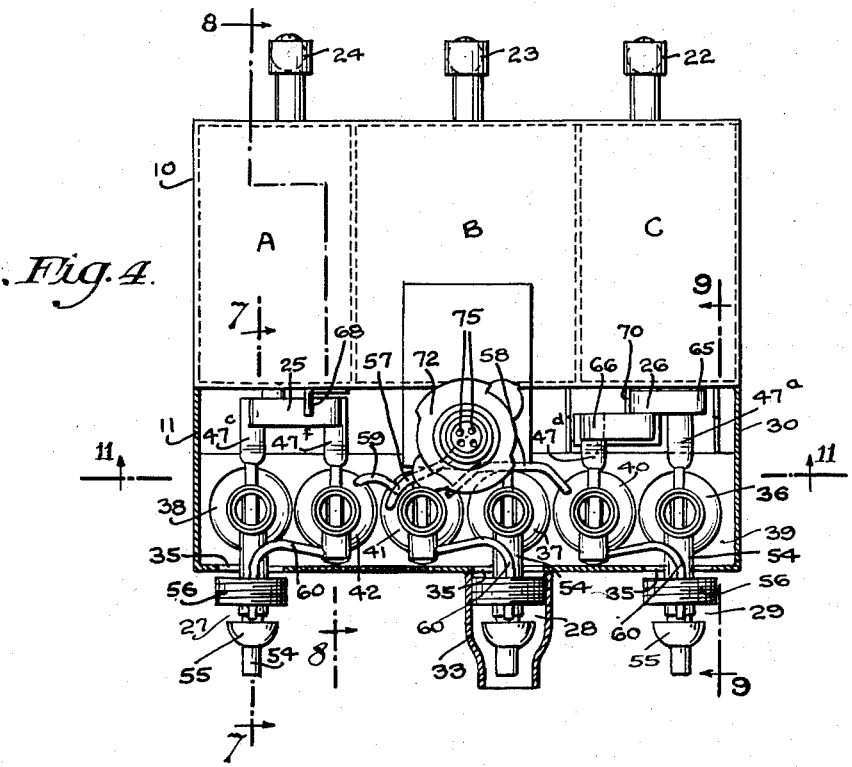
Figure 4 is a rear elevational view of the apparatus with the cover removed.

Referring now to the drawings, it will be observed that the beverage dispensing apparatus of the present invention is generally of box-like form, including an upper section 10 in which is contained the several different flavoring syrups for mixture with the carbonated water to produce the desired carbonated beverage, and a lower section 11 in which is contained the several valves and supply tubes for controlling the flow of the carbonated water either alone or in conjunction with a selected syrup with which it is to be mixed. The upper section 10 of the apparatus is in the form of a container having front, rear and side walls and a bottom 12, all formed of sheet metal and joined together to provide a liquid-tight chamber which is interiorly divided, by the partition members 13 and 14, into a plurality of individual syrup compartments A, B and C. The tops of these compartments are partially covered by a top plate 15 which is non-removably secured to the section 10, preferably in the form of a horizontal continuation of the back wall 16 of said section. If desired, the openings in the tops of the compartments A, B and C may be closed by a removable cover plate 17 (see Figures 3, 7, 8 and 9).

The several compartments A, B and C are adapted respectively to receive different flavoring syrups for mixture with carbonated water, each of said compartments being provided with a suitably screened discharge opening 18 in the base wall 12 thereof for discharge of the syrup by way of a tube 19 leading to a suitable control valve to be described more fully hereinafter. Fitted within each of the compartments A, B and C is a vertically extending tubular guide 20 within which is fitted a valve control stem 21, the upper ends of the several stems 21 being respectively provided with the operating handles 22, 23 and 24. It will be noted that the tubular guides 20 for the several valve operating stems extend vertically above and below the fixed top member 15 and the bottom 12 of the upper compartmented section 10 of the unit, the joints between each tubular guide and the said top and bottom members 15 and 12 being rendered liquid-tight, as by soldering or otherwise.

The valve stems 21 within each of the two compartments A and B are respectively fitted at their lower ends with a valve operating element 25 of the general form best shown in Figure 11, while the stem 21 within the compartment C is fitted at its lower end with a double-acting valve operating element 26 of the general form best shown in Figure 10. These valve operating elements 25, 25 and 26 are respectively operated to actuate the valve mechanisms which control the flow of the syrups from the compartments A, B and C as well as those which control the flow of the carbonated water into the liquid mixing heads, designated generally by the reference numerals 27, 28 and 29.

Figure 6:
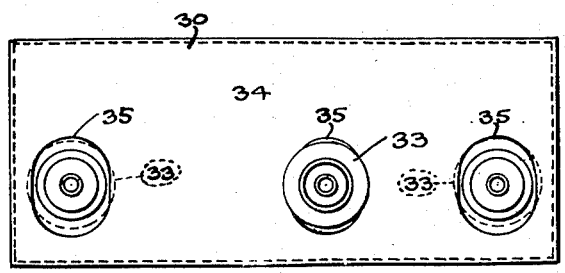
Figure 6 is a bottom plan view of the apparatus with the bottom cover in place.

The valve mechanisms just referred to, together with their operating elements 25, 25 and 26, the mixing heads 27, 28 and 29 and other associated parts to be now described in detail, are compactly disposed within the lower section 11 of the dispensing apparatus, the same being housed within a removable enclosure 30 having front, rear and side walls which are respectively disposed in substantially flush relation with the corresponding walls of the upper syrup-containing section 10 of the apparatus. Preferably, the upper edge of the front wall 31 of the enclosure 30 is inturned, as at 32, to provide a flange which is received within a longitudinally extending channel formed along the frontal bottom edge of the upper section 10 of the apparatus, the enclosure 30 being removably secured in position by the external discharge nozzles 33 (see Figures 4 and 7) of the mixing heads 27, 28 and 29. The bottom wall 34 of the enclosure 30 is provided with a plurality of elongated openings 35 (see Figures 4 and 6) through which the mixing heads 27, 28 and 29 are adapted freely to project when the external nozzles 33 are removed therefrom, these openings 35 being each of a width somewhat less than the overall diameter of the nozzle 33. Thus, the enclosure 30 is adapted to be freely positioned over the valve mechanisms to enclose the same and when the nozzle caps 33 are screwed into place (as shown in Figure 4), they serve to rigidly clamp the enclosure 30 securely in place.

Secured to the lower ends of the several syrup discharge tubes 19 are a set of laterally spaced dome-shaped members 36, 37 and 38, the rear ends of which are commonly sealed by a transversely extending plate 39. This plate 39 in turn supports a second set of similar dome-shaped members 40, 41 and 42, of which the member 40 is paired with the member 36, the member 41 with the member 37 and the member 42 with the member 38. As most clearly appears in Figures 3, 4 and 5, all of these members 36—38 and 40—42 are disposed with their axes in parallel relation and lying in a common horizontal plane, the outer ends of these members being each provided with a rearwardly extending tubular extension 43.

Fitted within each such tubular extension 43 (see particularly Figure 14) is a valve mechanism for controlling the delivery of liquid outwardly from the interior of its associated dome-shaped member. This valve mechanism in each instance essentially includes a valve seat 44, a valve 45 adapted to seat thereon, a spring-pressed valve stem 46 and an operating lever 47 for axially shifting the stem to open the valve against the restraining action of the coiled compression spring 48. The valve stem 46 is provided at its outer end with an enlarged bifurcated head 49 through which extends a transverse pin 50 adapted to be engaged by the notched end of the operating lever 47, the toe of which is fulcrumed, as at 51, within the interior of an annular bulge formed about the tubular body 43. A slot 52 formed in said body at a point diametrically opposite the lever fulcrum permits movement of the lever from the full line into the dotted line positions thereof as shown in Figure 14. Preferably, a washer or other suitable gasket or packing gland 53 closely embraces the valve stem 46 to prevent leakage of the liquid by way of the stem.

As has been indicated above, each of the dome-shaped members 36—38 and 40—42 is provided with a valve mechanism of the character just described, and for convenience in further describing the present apparatus, the several operating levers respectively associated with the members 36, 37, 38, 40, 41 and 42 have been designated by the separate reference numerals 47a, 47b, 47c, 47d, 47e and 47f.

Operatively associated with each of the members 36, 37 and 38 is a syrup discharge tube 54 which is fitted intermediate its length with an upwardly presenting annular cupped flange 55 into which is adapted to be projected the carbonated water for mixing with the flavoring syrup discharged from said tube 54. Also fitted upon the syrup discharge tube 54 above the cupped flange 55 is an exteriorly threaded boss 56 upon which is adapted to be threadedly received the external nozzle cap 33 hereinbefore referred to. The discharge tubes 54 are each in communication with the interiors of the members 36, 37 and 38 by way of the valves respectively actuated by the levers 47ᵃ, 47ᵇ and 47ᶜ (see particularly Figure 11), it being thus apparent that when these valves are opened, syrup may be freely discharged from the tubes 54 extending from the members 36, 37 and 38. These latter members, of course, are at all times filled with syrup delivered thereto from the upper compartments A, B and C by way of the intermediate tubes 19.

Carbonated water is delivered to each of the members 40, 41 and 42 from a suitable source of supply, which may be chilled by any of the conventional refrigerating means well known in the art, by way of the main supply tube 57 (see particularly Figures 4, 5 and 15) leading directly to the member 41, this latter member being in turn connected by the tubes 58 and 59 to the members 40 and 42. Thus, all three of the members 40, 41 and 42 are commonly supplied with carbonated water from a single source of supply. Discharge of the carbonated water from the several members 40, 41 and 42 is controlled in each case by means of a valve mechanism as hereinbefore described and shown in Figure 14, these valve mechanisms being actuated respectively by the levers 47ᵈ, 47ᵉ and 47ᶠ above referred to (see particularly Figure 11). The several members 40, 41 and 42 are respectively provided with discharge tubes 60 for the carbonated water, the discharge ends of each of which terminate just above the cupped flanges 55 of the syrup discharge tubes 54.

The operating levers 47ᶜ and 47ᶠ for the valve mechanisms of the associated pair of liquid receptacles 38 and 42 are secured together by a cam plate 61, while the levers 47ᵇ and 47ᵉ for the valve mechanisms of the second associated pair of receptacles 37 and 41 are similarly secured together by a cam plate 62. However, in the case of the third pair of associated receptacles 36 and 40, the operating levers 47ᵃ and 47ᵈ for their control valves are not secured together, but instead are individually provided with cam plates 63 and 64 (see Figure 1), the cam plate 63 carried by the lever 47ᵃ being of a length sufficient to engage the lever 47ᵈ, while the cam plate 64 carried by the lever 47ᵈ is of a shorter length such that its free end terminates short of the lever 47ᵃ.

The cam plates 61 and 62 are respectively adapted for engagement by the actuators 25—25 fixed to the lower ends of the valve stems 21 extending vertically through the syrup compartments A and B, it being noted that each of these actuators is of such shape that upon rotation of its associated valve stem through an angle of approximately 90 degrees, its free end engages and shifts the cam plate 60 (or 61) to simultaneously open the two valves controlling the flow of syrup and carbonated water into and through a single mixing head. Thus, upon rotation of the handle 24 from its position shown in Figures 1 and 3 into its position shown in Figures 7 and 8, the actuator 25 engages the cam plate 61 and shifts the latter to commonly open the valves associated with the syrup receptacle 38 and the carbonated water receptacle 42, thereby permitting simultaneous discharge and mixing of the syrup from compartment A and carbonated water from the source of supply.

Similarly, syrup from compartment B may be simultaneously delivered with carbonated water upon rotation of the operating handle 23 to effect engagement of its actuator 25 with the plate 62 controlling the intermediate pair of valves.

However, in the case of the actuator 26 fitted upon the lower end of the valve stem extending through compartment C, it is of the duplex form shown most clearly in Figure 10 having a pair of oppositely extending, vertically offset elements 65 and 66 respectively adapted to engage the cam plates 63 and 64 carried by the valve stems 47ᵃ and 47ᵈ. Thus, upon rotation of the handle 22 in one direction (as from its position in Figures 1, 2 and 9 into the position shown in Figure 12), the element 65 engages the upper cam plate 63 and so causes both levers 47ᵃ and 47ᵈ to be actuated to open both valves controlling the discharge of liquid from the receptacles 36 and 40. Syrup from compartment C is thereby mixed with carbonated water for discharge from the mixing head 29.

Upon rotation of the operating handle 22 in the opposite direction, i. e. into the position shown in Figure 13, the element 66 engages and shifts only the lower cam plate 64 which is carried by the lever 47ᵈ and is free of the lever 47ᵃ, thereby opening only the valve which controls the discharge of carbonated water from the receptacle 40. Thus, plain carbonated water may be discharged from the mixing head 29 as desired.

Figure 5:
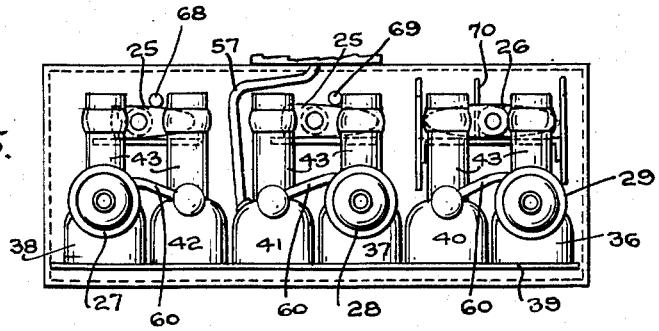
Figure 5 is a bottom plan view of the apparatus as shown in Figure 4.

As most clearly appears in Figures 4, 5 and 11, suitable stops are provided for limiting rotation of the several operating handles 22, 23 and 24 and their associated valve actuating parts. Thus, for actuators 25—25 respectively carried by the valve stems operated by the handles 22 and 23, suitable pins 68 and 69 are provided which limit the rotation of the actuators 25—25 to an arc of approximately 90 degrees, these pins being suitably secured to and projecting downwardly from the bottom wall 12 of the upper section 10 of the apparatus. In the case of the duplex actuator 26 carried by the valve stem operated by the handle 24, a stop 70 is provided, this stop being in the form of an elongated element secured to and depending from the bottom wall 12 of the upper section 10 of the apparatus and extending in a direction substantially at right angles to the cam plates 63 and 64.

Figure 15 illustrates a preferred arrangement which may be employed for effecting quick-detachable coupling of the apparatus of the present invention to a carbonated water supply pipe or conduit 71. Normally, this conduit 71 is part of a fixed installation with the discharge end of the conduit terminating at the point where it is desired to install the apparatus of the present invention. The carbonated water supply tube 57 of the apparatus is provided at its outer extremity with a fitting 72 which is adapted to be quick-detachably coupled to a complementally formed fitting 73 provided on the end of the main conduit 71 for the carbonated water. The fitting 72 is centrally counterbored, as at 74, and is provided with a plurality of passages 75 extending from the face of the counterbore to the delivery tube 57. The conduit 71 is internally provided with a valve seat 76 and with a spring-pressed valve 77 having a valve stem 78, the terminal end of which is adapted to engage the face of the counterbore 74 in the fitting 72 when the latter is coupled to the fitting 73 on the conduit 71. It will be apparent that when the coupling members 72 and 73 are secured together as shown, the valve 76—77 controlling the supply of carbonated water from the source will be open, while as soon as the couplings are separated, as when the apparatus of the present invention is detached from the conduit 71, the said valve 76—77 will immediately be closed to prevent further discharge of carbonated water from the conduit 71.

It will be appreciated that the apparatus of the present invention provides a simple, compact and readily installed unit for providing several different kinds of carbonated beverages, the selective preparation and discharge of which is effected by the simple manipulation of any one of the several operating handles conveniently located at the top of the unit. Also, the present apparatus provides for the discharge of plain carbonated water without any increase in the number of operating handles required for the preparation of the several different kinds of flavored carbonated beverages.

The proportions of the discharge openings in the syrup and carbonated water discharge tubes are, of course, carefully determined to insure the proper ratio of the carbonated water and the flavoring syrup, the carbonated water and syrup passages through each of the mixing heads 27, 28 and 29 being relatively so arranged as to prevent any possibility of a carbonated water backing up through the syrup passages. In the ordinary use of the apparatus of the present invention, one or the other of the operating handles 22, 23 and 24 will be moved from its closed to its fully open position, to thereby insure the full proportions of the syrup and carbonated water for a selected drink. However, even should these operating handles be only partially opened, the proportions of the syrup and carbonated water in the mixture delivered from the mixing head will not be changed due to the fact that the valves controlling the supply of syrup and carbonated water to any given mixing head are commonly actuated and controlled by a single operating handle.

It will be understood, of course, that the apparatus of the present invention is susceptible of various changes and modifications in the construction and arrangement of its several parts all without departing from the general principles or real spirit of the present invention, and it is accordingly intended to claim the same broadly, as well as specifically, as indicated by the appended claims.

What is claimed as new and useful is:

1. A dispensing apparatus for carbonated beverages comprising a syrup container having a discharge tube, a combined mixing head and nozzle embracing the outlet end of said syrup discharge tube; a syrup control valve mechanism operatively associated with the syrup discharge tube, a carbonated water control valve mechanism paired with said syrup control valve mechanism, actuating levers for said valve mechanisms, a cam plate interconnecting the levers of the paired valve mechanisms, and an externally controlled cam element rotatable into and out of engagement with said cam plate to effect conjoint actuation of the paired valve mechanisms.

2. A dispensing apparatus for carbonated beverages comprising a syrup container having a discharge tube, a combined mixing head and nozzle embracing the outlet end of said syrup discharge tube; a syrup control valve mechanism operatively associated with the syrup discharge tube, a carbonated water control valve mechanism paired with said syrup control valve mechanism, actuating levers for said valve mechanisms, a cam plate interconnecting the levers of the paired valve mechanisms, an externally controlled cam element rotatable into and out of engagement with said cam plate to effect conjoint actuation of the paired valve mechanisms, the cam plate interconnecting the actuating levers for said paired valve mechanisms being rigidly secured to one of said levers and extending freely over the other, and a second cam plate rigidly secured to the second of said last-mentioned levers and terminating short of the first one thereof, the rotatable cam element being alternatively engageable with one or the other of said cam plates.

3. In a dispensing apparatus of the character defined in claim 2 including an operating stem for said cam element, said stem extending upwardly through the syrup container and having a handle at its upper end for oscillating the stem about its longitudinal axis.

LOUIS GOTTLIEB.

REFERENCES CITED

The following references are of record in the file of this patent:

UNITED STATES PATENTS

| Number | Name | Date |
| --- | --- | --- |
| 159,915 | Gee | Feb. 16, 1875 |
| 300,170 | Van Riper et al. | June 10, 1884 |
| 911,000 | Fitzgibbon et al. | Jan. 26, 1909 |
| 1,429,574 | England et al. | Sept. 19, 1922 |
| 1,744,426 | Weber | Jan. 21, 1930 |
| 1,822,117 | Travis | Sept. 8, 1931 |
| 2,379,532 | Lloyd | July 3, 1945 |